United States Patent [19]

Murphy

[11] Patent Number: 5,089,141

[45] Date of Patent: Feb. 18, 1992

[54] CHEMICAL PROCESS FOR REMOVING SELENIUM FROM WATER

[75] Inventor: Andrew P. Murphy, Littleton, Colo.

[73] Assignee: The United States of America as represented by the Secretary of the Interior, Washington, D.C.

[21] Appl. No.: 610,884

[22] Filed: Nov. 9, 1990

[51] Int. Cl.$^5$ ............................................... C02F 1/70
[52] U.S. Cl. ................................ 210/719; 204/150; 210/723; 210/757; 210/902; 210/908; 210/912; 423/508
[58] Field of Search ............... 204/149, 150; 210/702, 210/717, 719, 723, 902, 908, 912, 757; 423/508–510

[56] References Cited

U.S. PATENT DOCUMENTS

| | | | |
|---|---|---|---|
| 3,766,036 | 10/1973 | McKaveney | 210/723 |
| 3,933,635 | 1/1976 | Marchant | 210/719 |
| 4,026,797 | 5/1977 | Nikolic et al. | 210/719 |
| 4,096,064 | 6/1978 | du Fresne | 210/914 |
| 4,405,464 | 9/1983 | Baldwin et al. | 210/719 |
| 4,806,264 | 2/1989 | Murphy | 210/695 |
| 4,940,549 | 7/1990 | Olsen et al. | 210/719 |

*Primary Examiner*—Peter Hruskoci
*Attorney, Agent, or Firm*—E. Philip Koltos

[57] ABSTRACT

A chemical process for selectively removing organoselenium compounds and selenate from water supplies. The process utilizes a combination of transition metal selected from the group consisting of nickel and copper and an electropositive metal selected from the group consisting of magnesium and aluminum to effectively remove selenium whether present in the water as organic or inorganic compounds or in ionic or non-ionic form.

12 Claims, No Drawings

CHEMICAL PROCESS FOR REMOVING SELENIUM FROM WATER

BACKGROUND OF THE INVENTION

1. Field of the Invention

The invention relates to a process for the treatment of water contaminated with selenium and particularly to a chemical process for the removal of organoselenium compounds and selenate from water supplies. More particularly, the invention relates to a chemical process for the selective removal of organoselenium compounds and selenate from water.

2. Description of the Prior Art

The importance of removing selenium from water has gained increasing popular support with the recognition of its potential for harm to humans, birds, and fish, as well as to livestock and agriculture. Murphy, in U.S. Pat. No. 4,806,264, points up the fact that high selenium levels are detrimental to human health, while Olsen et al, in U.S. Pat. No. 4,940,549, note that high concentrations of selenium are toxic to birds and fish and other marine life and that build-up of selenium in the perched water layer from agricultural irrigation can diminish land use for useful agriculture. In an effort to protect against these harms, Congress and State legislatures have enacted stringent federal and state laws concerning water pollution, including maximum levels of pollutants, such as selenium, in drinking water and water for release into ground systems.

Typical of prior art techniques for treating water contaminated with selenium is the method disclosed by Marchant in U.S. Pat. No. 3,933,635. Marchant is primarily concerned with treating the effluent from the water-scrubbing of off-gases from zinc smelter operations where the concentrate contains selenium in the form of selenious acid and in concentrations too high to meet regulations governing discharge into public waterways. However, Marchant suggests that his method may also be employed for removing selenium from other aqueous wastes such as those from copper refining processes, scrubber solutions from coal burning operations, etc. The essence of the Marchant process is the use of a metallic reducing agent, such as zinc, iron or aluminum, preferably in finely divided form. Following completion of the reduction reaction, precipitated solids, consisting predominantly of selenium and any unreacted reducing agent, are separated from the remaining solution by such conventional means as filtration, decanting, etc.

Nikolic et al, in U.S. Pat. No. 4,026,797, are principally concerned with the removal of selenium from copper-containing sulfuric acid leach solutions obtained from copper-nickel hydrometallurgy processes. They point out that prior art methods to remove selenium, such as the use of sulfur dioxide as a reductant, co-precipitation of Se(IV) with metal hydroxides, and fluidized bed cementation using elemental copper, suffer from a number of disadvantages including failure to provide a product liquor sufficiently low in selenium, non-selectivity, non-effectiveness in acid solutions, and restricted applicability to Se(IV). Nikolic et al disclose a method which they suggest is attended by advantages over the prior art in that it achieves a rejection of selenium from sulfuric acid copper sulfate electrolytes to levels below 2 ppm. In one embodiment of the method, they add to the electrolytes a substance selected from the group consisting of metals above copper in the electromotive series, excluding alkali metals, such as nickel, cobalt and iron, and then subject the solution to elevated temperature and pressure to form a selenium containing precipitate. In another embodiment, they add sodium sulfide in conjunction with a subsequent addition of ferric sulfate.

The prior art teaching of Marchant, supra, is contrasted by Baldwin et al, in U.S. Pat. No. 4,405,464, with laboratory and pilot plant studies showing that chemical precipitation employing alum, lime, ferrous sulfate or ferric sulfate is ineffective for removing selenium in the selenate or Se(VI) oxidation state from water. Baldwin et al teach that the prior art objective of effecting removal of selenium ions in the selenate oxidation state by chemical precipitation can be achieved by employing metallic iron to reduce selenate to a reduced selenium species, which then separates from the aqueous solution and is removed by cementation upon or precipitation with the oxidation product of the treating agent.

Murphy, in U.S. Pat. No. 4,806,264, notes that prior art methods of removing selenium from water systems have limited applications. He discusses known methods and divides them into four basic categories: desalting, biological, adsorption and chemical reduction. Desalting processes are indicated as characterized by such disadvantages as lack of specificity for Se(VI) with respect to sulfate ions, high cost and toxic brine waste. Biological processes are indicated as characterized by a significant advantage over desalting, namely, specificity for selenate ions. However, this advantage is more than offset by extended processing time, only partial reduction, and the likelihood of generating more toxic compounds, such as selenomethionine, which is indicated as being 10,000 times more toxic than selenate ions. Adsorption processes, like desalting, are indicated as lacking specificity for selenate ions over sulfate ions. Chemical reduction processes cited by Murphy include those disclosed by Marchant, Nikolic et al and Baldwin et al, supra. Murphy teaches that selenium ions can be selectively removed from an aqueous solution by reducing selenate and selenite ions to elemental selenium directly with ferrous hydroxide. The reaction is carried out under alkaline conditions and the resulting elemental selenium particles are contained within the highly magnetic oxidation product of ferric oxides, which can be removed by application of a magnetic field.

Olsen et al, in U.S. Pat. No. 4,940,549, disclose a method for removing selenium and molybdenum from agricultural drain waters. The method involves adjusting the pH of the drain water to an acidic range followed by adding a reducing agent, such as finely powdered iron. The iron is maintained in suspension by agitation while sulfur is added, and the reaction product is oxidized to effect selenium recovery as a precipitate. Olsen et al note that the prior art was primarily concerned with mine waters and similar drain waters and that efforts to remove selenium from agricultural drain waters have been unsuccessful. Complicating factors in such removal are indicated as the variety of selenium valences, including +6, +4, 0, and −2, as well as the presence of nitrates, which apparently tend to consume reducing agents by themselves being reduced to nitrites.

It is clear from a review of the prior art processes for removing selenium from water systems that a hiatus exists with respect to techniques for removing selenium when present in the form of organoselenium compounds. While many of the organoselenium compounds found in water are ionic and could be removed by the use of conventional desalting techniques such as ion exchange, reverse osmosis, or electrodialysis, such techniques are attended by the significant disadvantage of lack of specificity for selenium compounds relative to other ions present in the water. Depending on the water to be treated, such techniques may result in an unacceptable high cost because instead of the removal of one trace constituent, all or most ions must be removed. Desalting processes would result in a brine stream greater in concentration of selenium compounds than the influent stream, thereby compounding the problem of toxicity. In addition, large volumes of brine waste would be produced which would magnify problems associated with disposal.

Where the organoselenium compounds found in water are non-ionic, conventional desalting techniques are wholly ineffective to bring about removal. Use of adsorption beds, e.g., activated carbon, may effect removal, but their use is attended by the disadvantage of having to operate an additional process for selenium control in series with the chosen desalting process. The resultant increase in cost tends to make the operation prohibitive.

SUMMARY OF THE INVENTION

The invention comprises an improved chemical process for the treatment of water supplies contaminated with selenium. An essential feature of the invention is the treatment of water with a combination of a transition metal selected from the group consisting of nickel and copper and an electropositive metal selected from the group consisting of magnesium and aluminum. The metals are employed preferably in powder form, either separately or combined as an alloy or as a mixture and may be contained in a column through which selenium-containing water is pumped. The inventive process is characterized by the removal of selenium present in the water either as organoselenium compounds or as selenate. Hence, both forms of selenium, organic and inorganic, can be treated in one step. This suggests a significant advantage over the prior art ferrous hydroxide process, i.e., lower capital costs and lower operating costs. A distinct advantage of the process is that organoselenium compounds are removed notwithstanding they are present in water in ionic form or in non-ionic form. The inventive process is also characterized by selective removal of selenium compounds, thereby providing an economic advantage over such conventional desalting techniques as ion exchange, reverse osmosis, or electrodialysis. A further advantage is the fact that the process adds no heavy metal ions to the effluent water and effects a quantitative reduction in brine waste, thus alleviating any disposal problem. Still another advantage of the inventive process is the reduction in the number of unit operations that normally would be required to remove both ionic and non-ionic selenium compounds, i.e., normally such removal would employ both desalting and adsorption operations in series.

OBJECTS OF THE INVENTION

Accordingly, a principal object of the present invention is to provide an improved process for the treatment of water contaminated with selenium.

Another object of the invention is to provide an improved chemical process for the removal of organoselenium compounds and selenate from water supplies.

A further object of the invention is to provide an improved chemical process for the selective removal of organoselenium compounds and selenate from water supplies characterized by the removal of selenium compounds in both ionic and non-ionic form.

Still another object of the invention is to provide an improved chemical process for the selective removal of organoselenium compounds and selenate from water supplies which utilizes a combination of a transition metal selected from the group consisting of nickel and copper and an electropositive metal selected form the group consisting of magnesium and aluminum.

Other objects and advantages of the invention will be apparent to those skilled in the art upon reference to the following detailed description and the specific examples.

DETAILED DESCRIPTION AND SPECIFIC EMBODIMENTS

Example 1

Approximately 20 ml of a 0.5 milligram/liter selenomethionine solution was added to various glass bottles. Next, 2.5 grams of each metal powder identified in Table I was added to the appropriately labeled bottle, loosely capped, and allowed to react overnight. The next day, the liquid in each bottle was filtered through a 0.45 micron membrane into a labeled test tube. The resulting samples were then analyzed quantitatively for selenium and the percent removal of selenomethionine calculated in Table I.

TABLE I

|    | Mg | Al |
|----|----|----|
| Al | 20 | —  |
| Ti | 0  | 0  |
| Mn | 0  | 8  |
| Fe | 7  | 0  |
| Co | 6  | 0  |
| Ni | 76 | 45 |
| Cu | 55 | 81 |
| Zn | 6  | 9  |

It is obvious from the results set forth in Table I that the metal powder combinations of Ni-Mg, Ni-Al, Cu-Mg and Cu-Al are critical as compared with the other metal powder combinations in that their use produces a difference in kind rather than degree with respect to percent removal of selenomethionine. Trace metal analyses on these four samples showed no nickel or copper in the filtrate. The results are truly unexpected when the similarities of atomic numbers and atomic weights are considered. For example, Cu and Zn have atomic numbers of 29 and 30, respectively, and atomic weights of 64 and 65, respectively. Despite such similarity, Cu combined with Mg or Al exhibits an ability to remove nine times as much selenomethionine as does Zn combined with Mg or Al. An even more dramatic difference is noted when comparing Ni and Co, which have atomic numbers of 28 and 27, respectively, and atomic weights of 58.7 and 58.9, respectively. Combinations of Ni with Mg or Al exhibit a selenomethionine removal power that surpasses that of Co with Mg or Al by an order of magnitude greater than that exhibited by the Cu and Zn comparison.

Example 2

Using conditions identical to those employed in Example 1 with the exception that 0.2 milligram/liter sodium selenate was substituted for 0.5 milligram/liter selenomethionine, tests were run to determine the effectiveness of the metal powder combinations to remove selenate. Following quantitative analysis of test samples for selenium, the percent removal of selenate was calculated and tabulated in Table II.

TABLE II

|    | Mg  | Al  |
|----|-----|-----|
| Al | 71  | —   |
| Ti | 17  | 32  |
| Mn | 44  | 76  |
| Fe | 100 | 73  |
| Co | 23  | 4   |
| Ni | 39  | 100 |
| Cu | 35  | 12  |
| Zn | 59  | 100 |

It is apparent that the metal powder combinations of Ni-Mg, Ni-Al, Cu-Mg and Cu-Al, which proved outstanding in their ability to remove selenomethionine from water in Example 1, also exhibit a significant activity with respect to selenate. The results shown in Table II suggest quite clearly that the removal of selenate from water is an additional advantage attributable to the practice of the present invention.

Example 3

Using conditions identical to those employed in Examples 1 and 2 except that 0.2 milligram/liter of the variety of organoselenium compounds identified in Table III were substituted for the selenomethionine and selenate of Examples 1 and 2, respectively, tests were run to determine the effectiveness of the inventive metal powder combinations to remove organoselenium compounds from water. As in the other examples, the test samples were quantitatively analyzed for selenium, and the percent removal of the various organoselenium compounds was calculated and tabulated. The results are given in Table III.

TABLE III

| Compound          | Cu—Mg | Cu—Al | Ni—Mg | Ni—Al |
|-------------------|-------|-------|-------|-------|
| 6-selenopurine    | 100   | 100   | 100   | 100   |
| seleno-DL-ethionine | 39  | 73    | 52    | 44    |
| seleno-DL-cystine | 100   | 100   | 87    | 87    |
| 6-selonoinosine   | 100   | 100   | 100   | 100   |
| 6-selenoguanosine | 100   | 100   | 100   | 71    |
| selenourea        | 94    | 100   | 95    | 100   |

The results provided in Table III illustrate rather dramatically that the inventive metal powder combinations are capable not only of removing many different organoselenium compounds from water but also of effecting a 100 percent removal in most cases.

As indicated heretofore, selenium-laden waters could be pumped through a column containing a mix of the inventive metal powders. Larger particles may be preferred in the one case for faster settling rates. In another case, very fine particulates may be preferred because of more surface area and faster reaction rates. Regeneration of the bed may be accomplished by the use of either acid, base or organic solvent. Also, Oxidizing or reducing agents may be found useful to regenerate the bed.

Removal of selenium from the bed of metal powders may be accomplished by heating. If selenate reduces to selenite, iron oxide might be added to the bed to remove the selenite. If nickel is chosen for the transition metal, a magnetic field could be used to separate the nickel from the electropositive metal to aid in selenium removal from the bed.

It is also contemplated that the pH may be varied for different water systems and different metal powder combinations to maximize conditions to increase the effectiveness of the inventive process. It should be noted further that the inventive process may be employed in water systems containing nitrate and that removal of such nitrate may be an attendant advantage to the practice of such process. Also within the scope of the invention is the use of the inventive process to effect selenium removal from non-aqueous systems.

Additional embodiments and advantages within the scope of the claimed invention will be apparent to those skilled in the art.

What is claimed is:

1. In a chemical process for the treatment of selenium containing water, wherein said selenium is in the form of organic and inorganic compounds, the improvement comprising adding to said water an effective amount of a combination consisting essentially of a transition metal selected from the group consisting of nickel and copper and a metal consisting of either magnesium or aluminum, and removing said selenium from said water.

2. A process according to claim 1, wherein said transition metal and magnesium or aluminum are in alloy form.

3. A process according to claim 1, wherein said transition metal and magnesium or aluminum are in powder form.

4. A process according to claim 1, wherein said transition metal and magnesium or aluminum metal are contained in a column through which said selenium-containing water passes.

5. A process according to claim 1, wherein said selenium is in the form of ionic and non-ionic compounds.

6. A chemical process for the selective removal of organoselenium compounds and selenate from water supplies which comprises adding to said water supplies an effective amount of a combination consisting essentially of a transition metal selected from the group consisting of nickel and copper and a metal consisting of either magnesium or aluminum, and removing said organoselenium compounds and selenate from said water supplies.

7. A process according to claim 6, wherein organoselenium compounds are present in ionic or non-ionic form.

8. A process according to claim 6, wherein said combination of metals consists of nickel and magnesium.

9. A process according to claim 6, wherein said combination of metals consists of nickel and aluminum.

10. A process according to claim 6, wherein said combination of metals consists of copper and magnesium.

11. A process according to claim 6, wherein said combination of metals consists of copper and aluminum.

12. A process according to claim 6, wherein said combination of metals are contained in a column through which said water supplies pass.

* * * * *